US009517533B2

(12) United States Patent
Uchida et al.

(10) Patent No.: US 9,517,533 B2
(45) Date of Patent: *Dec. 13, 2016

(54) WELDED PORTION INSPECTION APPARATUS AND INSPECTION METHOD THEREOF, WITH INSPECTION IN DIFFERENT ZONES OF THE MOLTEN POOL

(71) Applicant: TOYOTA JIDOSHA KABUSHIKI KAISHA, Toyota-shi, Aichi-ken (JP)

(72) Inventors: Keisuke Uchida, Nagoya (JP); Masashi Furukawa, Toyota (JP); Hiroomi Kobayashi, Okazaki (JP); Atsushi Kawakita, Miyoshi (JP); Shuhei Ogura, Nagakute (JP); Hiroaki Kishi, Toyota (JP); Eiji Akamatsu, Toyota (JP); Yuta Iwamoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/781,129

(22) PCT Filed: Mar. 28, 2014

(86) PCT No.: PCT/IB2014/000449
§ 371 (c)(1),
(2) Date: Sep. 29, 2015

(87) PCT Pub. No.: WO2014/155190
PCT Pub. Date: Oct. 2, 2014

(65) Prior Publication Data
US 2016/0052091 A1 Feb. 25, 2016

(30) Foreign Application Priority Data

Mar. 29, 2013 (JP) ................................ 2013-074837

(51) Int. Cl.
*G01N 21/00* (2006.01)
*B23K 31/12* (2006.01)
(Continued)

(52) U.S. Cl.
CPC .............. *B23K 31/125* (2013.01); *B23K 26/03* (2013.01); *B23K 26/21* (2015.10); *B23K 26/24* (2013.01); *G01B 11/30* (2013.01)

(58) Field of Classification Search
CPC .... G01N 21/553; G01N 21/55; G01N 21/554; G01N 21/474; G01N 21/57
See application file for complete search history.

(56) References Cited

U.S. PATENT DOCUMENTS

| 4,572,941 A |   | 2/1986 | Sciaky et al. |
|---|---|---|---|
| 5,651,903 A | * | 7/1997 | Shirk ................... B23K 26/034 219/121.63 |

(Continued)

FOREIGN PATENT DOCUMENTS

| JP | 03-080596 B2 | 12/1991 |
|---|---|---|
| JP | 2008-087056 A | 4/2008 |

(Continued)

*Primary Examiner* — Tarifur Chowdhury
*Assistant Examiner* — MD M Rahman
(74) *Attorney, Agent, or Firm* — Sughrue Mion, PLLC

(57) ABSTRACT

A welding laser beam (L1) is radiated along welding loci (C11, C12) set in workpieces (W1, W2), or an inspection laser beam (L5) is radiated along scanning loci (C51, C52) set in a molten pool (Y1) of the workpieces that are molten by radiation of the welding laser beam, a returned light beam (L2) including reflection light from the molten pool, vapor light caused due to melting and evaporation of the workpieces, and thermal radiation light emitted from the molten pool is received, and a welding state of a welded portion of the workpieces is inspected based on an intensity of a returned light beam received in a first region inside the molten pool which is relatively close to a given point and an intensity of a returned light beam received in a second region inside the molten pool which is relatively spaced from the given point.

12 Claims, 13 Drawing Sheets

(51) Int. Cl.
   *B23K 26/03*   (2006.01)
   *B23K 26/24*   (2014.01)
   *G01B 11/30*   (2006.01)

(56) References Cited

U.S. PATENT DOCUMENTS

| | | | |
|---|---|---|---|
| 6,791,057 B1 | 9/2004 | Kratzsch et al. | |
| 6,937,329 B2 * | 8/2005 | Esmiller | B23K 1/0056 219/121.63 |
| 2011/0215074 A1 * | 9/2011 | Wang | B23K 9/091 219/121.64 |

FOREIGN PATENT DOCUMENTS

| | | |
|---|---|---|
| JP | 2008-272767 A | 11/2008 |
| JP | 2014-195822 A | 10/2014 |
| WO | 2014/155191 A2 | 10/2014 |

* cited by examiner

<HOLED WELD>

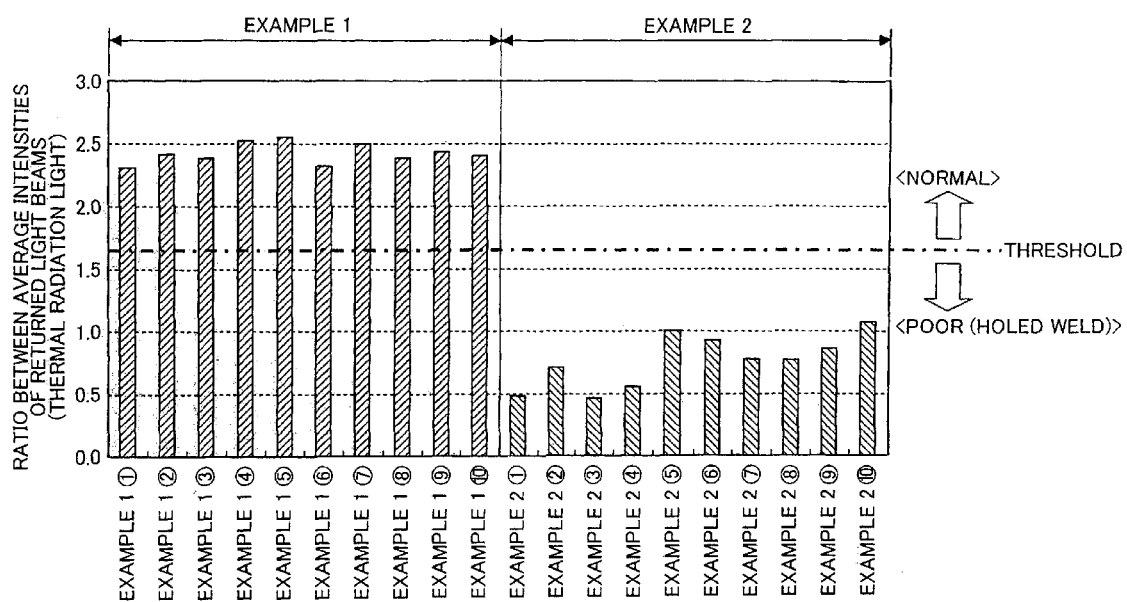

WELDED PORTION INSPECTION APPARATUS AND INSPECTION METHOD THEREOF, WITH INSPECTION IN DIFFERENT ZONES OF THE MOLTEN POOL

BACKGROUND OF THE INVENTION

1. Field of the Invention

The present invention relates to a welded portion inspection apparatus and an inspection method thereof, and relates to an inspection apparatus that inspects a welding state of a welded portion formed at the time when a plurality of workpieces is welded by a laser beam, for example, and an inspection method thereof.

2. Description of Related Art

When two steel sheets are put on top of one another and laser beam welding is performed thereon, a quality evaluation is performed on a welded portion formed by the laser beam welding. As an example of such a quality evaluation on the welded portion formed by the laser beam welding, Japanese Patent Application Publication No. 2008-87056 (JP 2008-87056 A) describes a technique to perform a quality evaluation of laser beam welding by use of reflection light of a laser beam.

In a laser beam welding quality determination system described in JP 2008-87056 A, a YAG laser is radiated from a laser torch, for example, and laser reflection light is received by first light receiving output means from a forward-diagonally upward side of a welding proceeding direction. Further, welding light including vapor light (plume) and the laser reflection light is received by second light receiving output means in a direction coaxial to a radiation direction of the laser beam. The laser reflection light and the welding light that are received simultaneously in two predetermined directions are converted into electrical signals according to their respective intensities. This system determines a welding quality based on the signal intensities of the electrical signals or changes thereof.

According to the laser beam welding quality determination system described in JP 2008-87056 A, the laser reflection light and the welding light are received simultaneously in two predetermined directions different from each other and their respective light receiving signal intensities are compared with a threshold set appropriately. Hereby, it is possible to determine occurrence of any one of the following various types of poor welding: weld shrinkage (underfill) in which a weld bead hollows to bury a gap between steel sheets; unjoined weld in which upper and lower steel sheets are not joined due to an excessively large gap between the steel sheets; depressed weld in which a bead is depressed similarly due to an excessively large gap between steel sheets; and molten weld in which a bead disappears accidentally due to fluctuation of a thermal balance; and holed weld.

However, in the laser beam welding quality determination system described in JP 2008-87056 A, in a case where the laser torch is apart from workpieces (steel sheets), for example, the electrical signals obtained from the received laser reflection light and welding light become weak. On that account, determination accuracy of poor welding may decrease. Particularly, in the depressed weld in which a bead is depressed in the laser beam welding, those changes of the electrical signals which are caused due to poor welding decrease. This may cause such a case where poor welding in the workpieces cannot be detected minutely. Further, it is known that vapor light caused due to melting and evaporation of the workpieces and thermal radiation light emitted from a molten pool of the workpieces change according to a workpiece temperature, and the electrical signals obtained from the received laser reflection light and the welding light and the threshold to determine the quality of the laser beam welding change according to the workpiece temperature. Because of this, in a case where the workpiece temperature largely fluctuates in the laser beam welding, the determination accuracy of the poor welding of the workpieces may further decreases.

SUMMARY OF THE INVENTION

The present invention provides a welded portion inspection apparatus that is able to minutely inspect a welding state of a welded portion of workpieces in remote welding in which welding is performed such that the workpieces are spaced from a laser torch, and an inspection method thereof.

A first aspect of the invention relates to a welded portion inspection apparatus that inspects a welding state of a welded portion formed at the time when a plurality of workpieces is welded. The welded portion inspection apparatus includes: a radiation portion that radiates a welding laser beam along a welding locus set in the workpieces so as to weld the workpieces, or radiates an inspection laser beam along a scanning locus set in a molten pool of the workpieces that are molten by the welding laser beam; a light-receiving portion that receives a returned light beam including at least one of reflection light of the welding laser beam or the inspection laser beam radiated by the radiation portion, the reflection light being reflected from the molten pool of the workpieces, vapor light caused due to melting and evaporation of the workpieces, and thermal radiation light emitted from the molten pool of the workpieces; and an inspection portion that inspects a welding state of a welded portion of the workpieces based on an intensity of a returned light beam received by the light-receiving portion in a first region inside the molten pool of the workpieces which is relatively close to a given point and an intensity of a returned light beam received by the light-receiving portion in a second region inside the molten pool of the workpieces which is relatively spaced from the given point.

According to the above aspect, the welding state of the welded portion of the workpieces is inspected based on the intensity of the returned light beam received in the first region inside the molten pool formed in the workpieces which is relatively close to the given point and the intensity of the returned light beam received in the second region inside the molten pool formed in the workpieces which is relatively spaced from the given point. Accordingly, in a case of remote welding in which welding is performed such that the radiation portion is spaced from the workpieces, for example, even if an electrical signal obtained from the returned light beam received by the light-receiving portion is weak or even if the intensity of the returned light beam received by the light-receiving portion changes according to a change of a workpiece temperature, it is possible to minutely inspect the welding state of the welded portion formed in the workpieces.

In the above aspect, the inspection portion may inspect the welding state of the welded portion of the workpieces based on a ratio between the intensity of the returned light beam received by the light-receiving portion in the first region and the intensity of the returned light beam received by the light-receiving portion in the second region.

According to the above aspect, the welding state of the welded portion of the workpieces is inspected based on the ratio between the intensity of the returned light beam received in the first region and the intensity of the returned light beam received in the second region. Accordingly, even if an electrical signal obtained from the returned light beam received by the light-receiving portion is weak or even if the intensity of the returned light beam received by the light-receiving portion changes according to a change of a workpiece temperature, for example, it is possible to determine the welding state of the welded portion formed in the workpieces, based on substantially uniform criteria, thereby making it possible to more minutely inspect the welding state of the welded portion of the workpieces.

In the above aspect, the inspection portion may inspect the welding state of the welded portion of the workpieces based on an average intensity of the returned light beam received by the light-receiving portion in the first region and an average intensity of the returned light beam received by the light-receiving portion in the second region.

According to the above aspect, the welding state of the welded portion of the workpieces is inspected based on the average intensity of the returned light beam received in the first region and the average intensity of the returned light beam received in the second region. Accordingly, even if the intensity of the returned light beam received by the light-receiving portion changes according to a change of a workpiece temperature or periodic vibration of a liquid level of the molten pool, for example, it is possible to determine the welding state of the welded portion formed in the workpieces, based on substantially uniform criteria, thereby making it possible to further more minutely inspect the welding state of the welded portion of the workpieces.

Note that the average intensity of the returned light beam received by the light-receiving portion in the first region is that intensity of the returned light beam per unit length, per unit area, or per unit time which is obtained by dividing a total sum of intensities of the returned light beam received by the light-receiving portion in the first region, by a length scanned by a laser beam in the first region, an area of the first region, a time during which the laser beam performs scanning in the first region, or the like. Further, the average intensity of the returned light beam received by the light-receiving portion in the second region is similarly that intensity of the returned light beam per unit length, per unit area, or per unit time which is obtained by dividing a total sum of intensities of the returned light beam received by the light-receiving portion in the second region, by a length scanned by a laser beam in the second region, an area of the second region, a time during which the laser beam performs scanning in the second region, or the like.

Further, a second aspect of the invention relates to a welded portion inspection method that inspects a welding state of a welded portion formed at the time when a plurality of workpieces is welded. The welded portion inspection method includes radiating a welding laser beam along a welding locus set in the workpieces so as to weld the workpieces, or radiating an inspection laser beam along a scanning locus set in a molten pool of the workpieces that are molten by the welding laser beam; receiving a returned light beam including at least one of reflection light of the welding laser beam or the inspection laser beam which is reflected from the molten pool of the workpieces, vapor light caused due to melting and evaporation of the workpieces, and thermal radiation light emitted from the molten pool of the workpieces; and inspecting a welding state of a welded portion of the workpieces based on an intensity of a returned light beam received in a first region inside the molten pool of the workpieces which is relatively close to a given point and an intensity of a returned light beam received in a second region inside the molten pool of the workpieces which is relatively spaced from the given point.

According to the above aspect, the welding state of the welded portion of the workpieces is inspected based on the intensity of the returned light beam received in the first region inside the molten pool formed in the workpieces which is relatively close to the given point and the intensity of the returned light beam received in the second region inside the molten pool formed in the workpieces which is relatively spaced from the given point. Accordingly, in a case of remote welding in which welding is performed such that a laser radiation portion is spaced from the workpieces, for example, even if an electrical signal obtained from the returned light beam thus received is weak or even if an intensity of the returned light beam thus received changes according to a change of a workpiece temperature, it is possible to minutely inspect a welding state of a welded portion formed in the workpieces.

As understood from the above description, the first and second aspects of the invention have such a simple configuration that, at the time when a plurality of workpieces is welded, a welding state of a welded portion of the workpieces is inspected based on an intensity of a returned light beam received in the first region inside a molten pool of the workpieces which is relatively close to a given point and an intensity of a returned light beam received in the second region inside the molten pool of the workpieces which is relatively spaced from the given point. Accordingly, even if an electrical signal obtained from the returned light beam is weak or even if the intensity of the returned light beam changes according to a change of a workpiece temperature, it is possible to minutely inspect the welding state of the welded portion of the workpieces.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a view illustrating ratios between average intensities of returned light beams in the inspection samples according to Examples 1, 2.

DETAILED DESCRIPTION OF EMBODIMENTS

The following describes embodiments of a welded portion inspection apparatus and an inspection method thereof according to the present invention, with reference to the drawings.

[Embodiment 1 of Welded Portion Inspection Apparatus]

Figure 1:
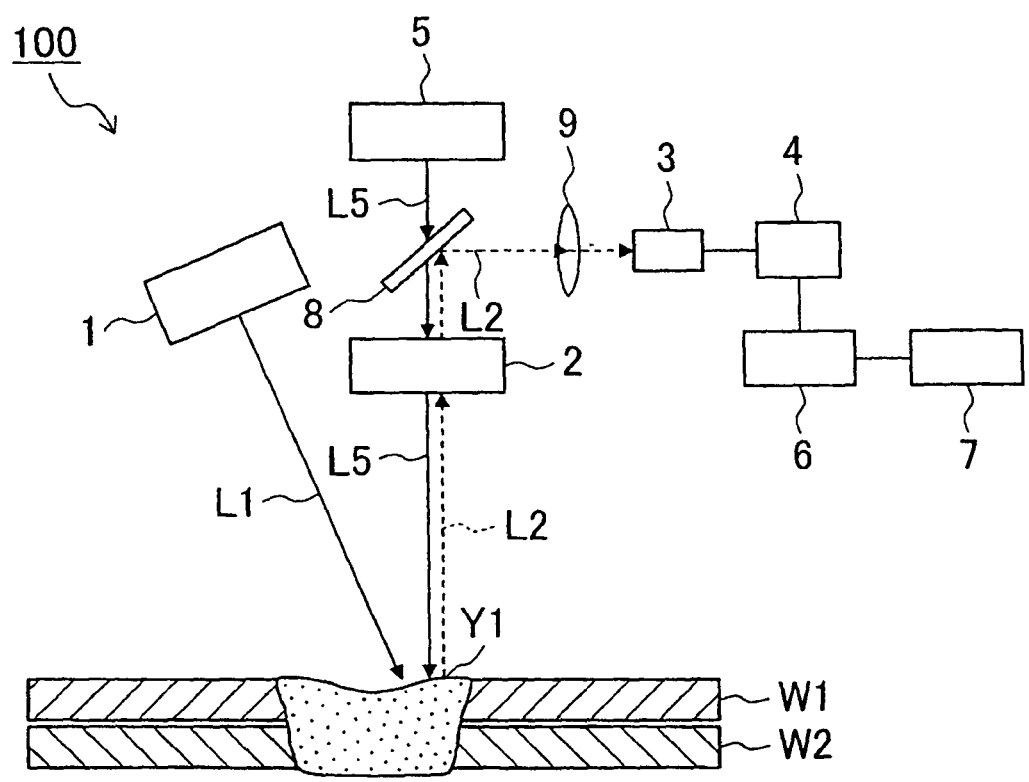
FIG. 1 is an overall configuration diagram schematically illustrating an overall configuration of Embodiment 1 of a welded portion inspection apparatus of the present invention.
Figure 2:
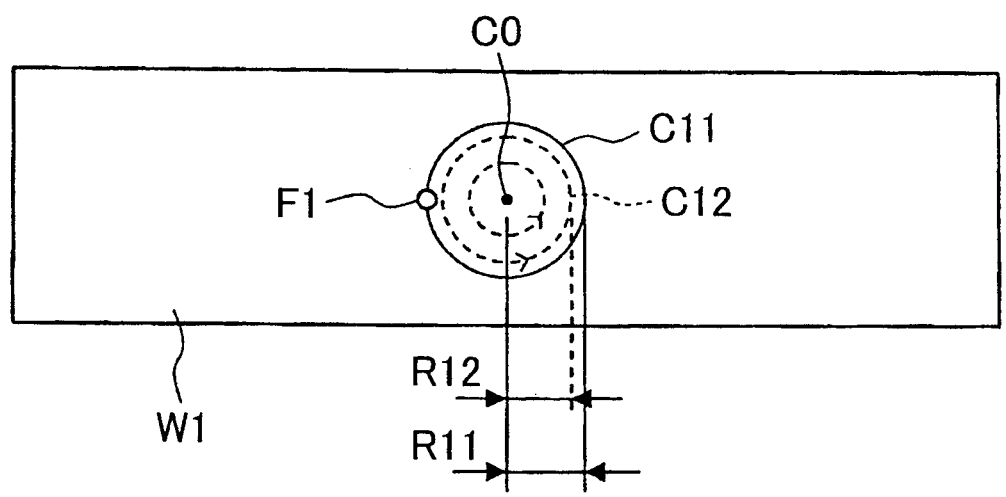
FIG. 2 is a top view to describe a form of radiation of a welding laser beam from a welding radiation portion of the inspection apparatus as illustrated in FIG. 1.
Figure 3:
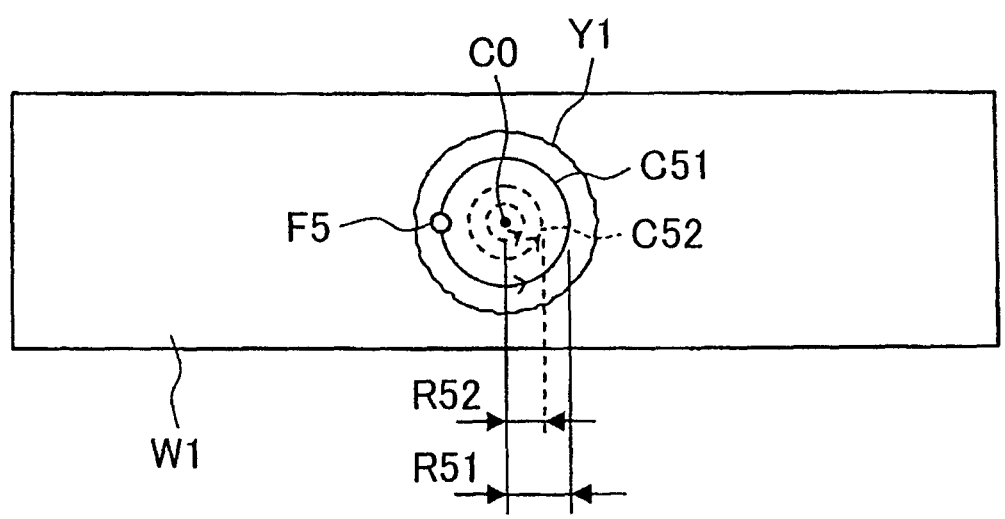
FIG. 3 is a top view to describe a form of radiation of an inspection laser beam from an inspection radiation portion of the inspection apparatus as illustrated in FIG. 1.

Initially described is Embodiment 1 of the welded portion inspection apparatus of the present invention with reference to FIGS. 1 to 3.

FIG. 1 is an overall configuration diagram schematically illustrating an overall configuration of Embodiment 1 of the welded portion inspection apparatus of the present invention. Further, FIG. 2 is a top view to describe a form of radiation of a welding laser beam from a welding radiation portion of the inspection apparatus as illustrated in FIG. 1, and FIG. 3 is a top view to describe a form of radiation of an inspection laser beam from an inspection radiation portion of the inspection apparatus.

An inspection apparatus 100 illustrated in FIG. 1 is mainly constituted by a welding radiation portion 1, an inspection radiation portion 5, a light-receiving portion 2, a conversion portion 3, an amplifier 4, an inspection portion 6, and a CRT (Cathode Ray Tube) 7.

In order to weld two workpieces (e.g., steel sheets) W1, W2 put on top of one another or disposed slightly spaced from each other, the welding radiation portion 1 radiates a welding laser beam (e.g., a YAG laser having a predetermined laser wavelength) L1 to the two workpieces W1, W2.

More specifically, as illustrated in FIG. 2, the welding radiation portion 1 rotates a focal point F1 of the welding laser beam L1 several times along a generally round-shaped welding locus C11 having a radius R11 set in the workpiece W1, so as to radiate the welding laser beam L1 several times on the welding locus C11. Subsequently, the welding radiation portion 1 moves the focal point F1 of the welding laser beam L1 inside the welding locus C11, and rotates the focal point F1 of the welding laser beam L1 several times along a generally round-shaped welding locus C12 which has a radius R12 that is smaller than the radius R11 and which is coaxial to the welding locus C11, so as to radiate the welding laser beam L1 several times on the welding locus C12. By repeating such a radiation step of the welding laser beam L1, a generally round-shaped welded portion is formed in the workpieces W1, W2, thereby joining the workpieces W1, W2 by welding (also referred to as Laser Screw Welding). Note that a center C0 of the welding locus C11 or the welding locus C12 is a welding center of the welded portion formed in the workpieces W1, W2.

Here, by radiation of the welding laser beam L1 from the welding radiation portion 1, a molten pool Y1 where the workpieces W1, W2 are molten is formed on right and left sides of the welding laser beam L1 and behind the welding laser beam L1 in a traveling direction of the welding laser beam L1. In Embodiment 1, since the welding laser beam L1 is radiated along the generally round-shaped welding loci C1, C2 as described above, a generally round-shaped molten pool Y1 is formed in the workpieces W1, W2.

As illustrated in FIG. 1, the inspection radiation portion 5 radiates an inspection laser beam L5 to the molten pool Y1 in a molten state via an optical system 8 and the light-receiving portion 2. More specifically, as illustrated in FIG. 3, the inspection radiation portion 5 rotates a focal point F5 of the inspection laser beam L5 several times at a generally constant speed along a generally round-shaped scanning locus C51 having a radius R51 set inside an outer edge of the molten pool Y1, so as to radiate the inspection laser beam L5 several times on the scanning locus C51. Subsequently, the inspection radiation portion 5 moves the focal point F5 of the inspection laser beam L5 inside the scanning locus C51, and rotates the focal point F5 of the inspection laser beam L5 several times along a generally round-shaped scanning locus C52 which has a radius R52 that is smaller than the radius R51 and which is coaxial to the scanning locus C51, so as to radiate the inspection laser beam L5 several times on the scanning locus C52. By repeating such a radiation step of the inspection laser beam L5, the inspection radiation portion 5 radiates the inspection laser beam L5 to a whole of the generally round-shaped molten pool Y1 formed in the workpieces W1, W2. Note that a center of the scanning loci C51, C52 is set to a welding center C0 of the welding loci C11, C12, for example.

As illustrated in FIG. 1, while the inspection laser beam L5 is radiated from the inspection radiation portion 5 to the molten pool Y1, the light-receiving portion 2 receives a returned light beam L2 including reflection light of the inspection laser light L5 which is reflected from the molten pool Y1 of the workpieces W1, W2, vapor light (plasma light) caused due to melting and evaporation of the workpieces W1, W2, thermal radiation light (infrared light) emitted from the molten pool Y1 of the workpieces W1, W2, and the like.

The conversion portion 3 converts, into an electrical signal, the returned light beam L2 received by the light-receiving portion 2 and condensed via the optical system 8 and a condenser lens 9, and outputs the electrical signal to the amplifier 4. The amplifier 4 amplifies a signal intensity of the electrical signal output from the conversion portion 3, and transmits it to the inspection portion 6.

The inspection portion 6 performs signal processing on the electrical signal transmitted from the amplifier 4, and inspects a welding state of the welded portion formed in the workpieces W1, W2. More specifically, the inspection portion 6 calculates an average intensity of a returned light beam L2 received by the light-receiving portion 2 in a region inside the outer edge of the molten pool Y1 which is relatively close to the welding center C0 (e.g., a locus on the scanning locus C52 and on a relatively inner side with respect to the welding center C0), and an average intensity of a returned light beam L2 received by the light-receiving portion 2 in a region inside the outer edge of the molten pool which is relatively spaced from the welding center C0 (e.g., a locus on the scanning locus C51 and on a relatively outer side with respect to the welding center C0). Then, the inspection portion 6 inspects the welding state of the welded portion formed in the workpieces W1, W2 based on a ratio between the average intensities of the returned light beams L2. Further, the inspection portion 6 transmits, to the CRT 7, a signal processing result on the electrical signal transmitted from the amplifier 4. The CRT 7 displays the signal processing result transmitted from the inspection portion 6.

[Embodiment 1 of Welded Portion Inspection Method]

Next will be described Embodiment 1 of a welded portion inspection method of the present invention by use of the welded portion inspection apparatus 100 illustrated in FIG. 1, with reference to FIGS. 4 to 9.

Figure 4:
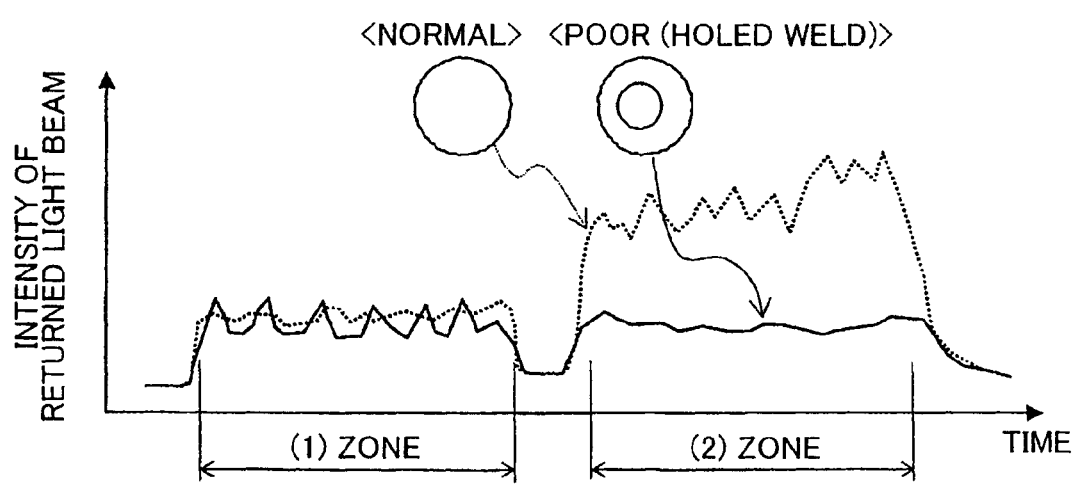
FIG. 4 is a view illustrating an example of an intensity of a returned light beam in time series.
Figure 5A:
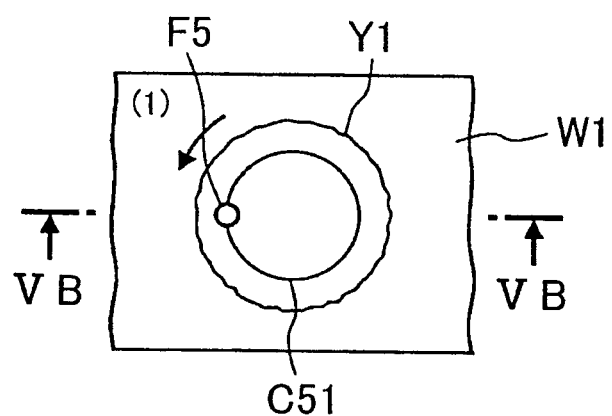
FIG. 5A is a top view to describe an exemplary relationship between a molten pool, and a focal point and a scanning locus of the inspection laser beam in a case where a welding state of a welded portion is normal.
Figure 5B:
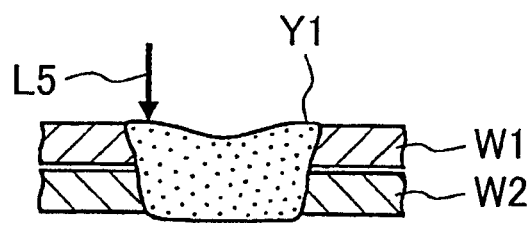
FIG. 5B is a view taken along an arrow VB-VB in FIG. 5A.
Figure 6A:
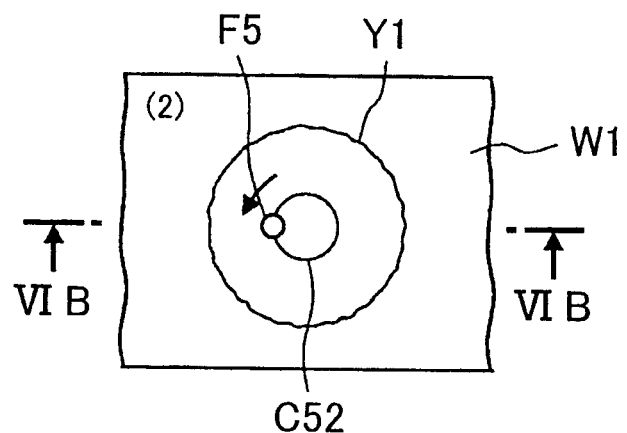
FIG. 6A is a top view to describe another exemplary relationship between the molten pool, and the focal point and the scanning locus of the inspection laser beam in the case where the welding state of the welded portion is normal.
Figure 6B:
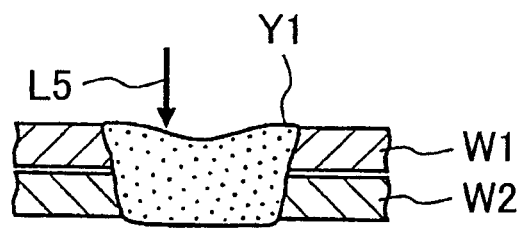
FIG. 6B is a view taken along an arrow VIB-VIB in FIG. 6A.
Figure 7A:
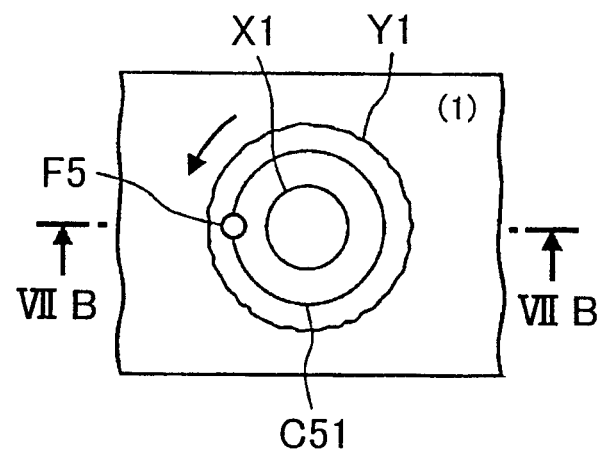
FIG. 7A is a top view to describe an exemplary relationship between the molten pool, and the focal point and the scanning locus of the inspection laser beam in a case where the welding state of the welded portion is poor.
Figure 7B:
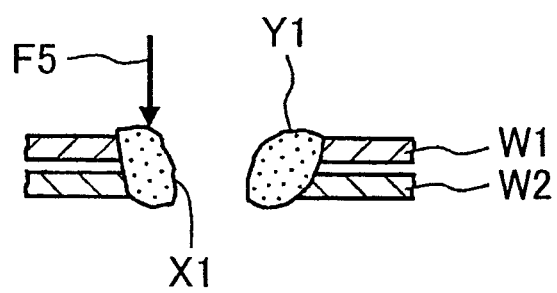
FIG. 7B a view taken along an arrow VIIB-VIIB of FIG. 7A.
Figure 8A:
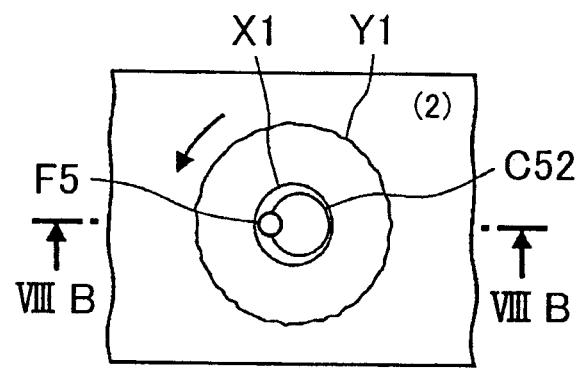
FIG. 8A is a top view to describe another exemplary relationship between the molten pool, and the focal point and the scanning locus of the inspection laser beam in the case where the welding state of the welded portion is poor.
Figure 8B:
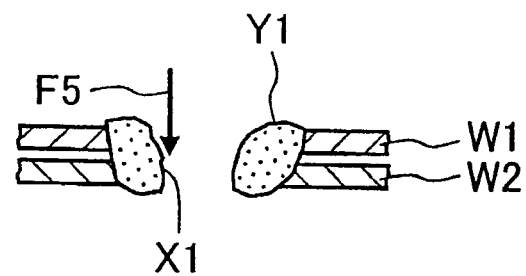
FIG. 8B a view taken along an arrow VIIIB-VIIIB of FIG. 8A.
Figure 9:
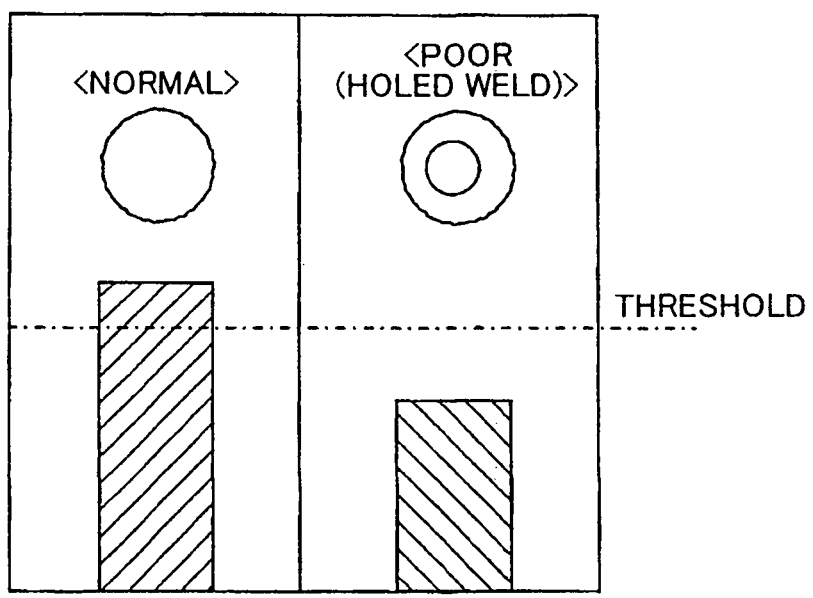
FIG. 9 is a view illustrating exemplary ratios between average intensities of returned light beams in the case where the welding state of the welded portion is normal and in the case where the welding state of the welded portion is poor.

FIG. 4 is a view illustrating, in time series, an example of that intensity of the returned light beam which is transmitted to the inspection portion 6 of the inspection apparatus 100 illustrated in FIG. 1. Further, FIG. 5A is a top view to describe an exemplary relationship between the molten pool, and the focal point and the scanning locus of the inspection laser beam in a case where the welding state of the welded portion is normal, and FIG. 5B is a view taken along an arrow VB-VB of FIG. 5A. Further, FIG. 6A is a top view to describe another exemplary relationship between the molten pool, and the focal point and the scanning locus of the inspection laser beam in the case where the welding state of the welded portion is normal, and FIG. 6B is a view taken along an arrow VIB-VIB of FIG. 6A. Further, FIG. 7A is a top view to describe an exemplary relationship between the molten pool, and the focal point and the scanning locus of the inspection laser beam in a case where the welding state of the welded portion is poor, and FIG. 7B is a view taken along an arrow VIIB-VIIB of FIG. 7A. Further, FIG. 8A is a top view to describe another exemplary relationship between the molten pool, and the focal point and the scanning locus of the inspection laser beam in the case where the welding state of the welded portion is poor, and FIG. 8B is a view taken along an arrow VIIIB-VIIIB of FIG. 8A. Further, FIG. 9 is a view illustrating exemplary ratios between average intensities of returned light beams in the case where the welding state of the welded portion is normal and in the case where the welding state of the welded portion is poor.

In terms of a case where the welding state of the welded portion is normal (a case where the workpieces W1, W2 are welded normally), the following cases are compared with each other: a case where the focal point F5 of the inspection laser beam L5 is rotated several times along the generally round-shaped scanning locus C51 set in the molten pool Y1 so as to radiate the inspection laser beam L5 several times on the scanning locus C51 (see FIGS. 5A and 5B); and a case where the focal point F5 of the inspection laser beam L5 is rotated several times along the generally round-shaped scanning locus C52 having a radius smaller than that of the scanning locus C51 so as to radiate the inspection laser beam L5 several times on the scanning locus C52 (see FIGS. 6A and 6B). In the case where the inspection laser beam L5 is radiated on the scanning locus C52, the intensity of the returned light beam L2 increases due to an increase of a workpiece temperature, and the like. In view of this, as illustrated in a dotted line of FIG. 4, the intensity of the returned light beam L2 received by the light-receiving portion 2 and transmitted to the inspection portion 6 via the conversion portion 3 and the amplifier 4 is larger in the case where the inspection laser beam L5 is radiated on the scanning locus C52 subsequently to the scanning locus C51 (a zone (2) in FIG. 4), as compared with the case where the inspection laser beam L5 is radiated several times on the scanning locus C51 (a zone (1) in FIG. 4).

In the meantime, in a case where the welding state of the welded portion is poor (e.g., in a case of holed weld in which the workpieces are both molten and depressed), part of or all of the inspection laser beam L5 radiated from the inspection radiation portion 5 passes through the workpiece W1 or the workpiece W2 (see FIG. 8B) depending on a positional relationship between the scanning locus set in the molten pool Y1 and a poor welding portion X1, so that an increase of the workpiece temperature is restrained. In view of this, as illustrated in a continuous line of FIG. 4, in a case where the focal point F5 of the inspection laser beam L5 is rotated several times along the generally round-shaped scanning locus C51 set in the molten pool Y1 so as to radiate the inspection laser beam L5 several times on the scanning locus C51 (see FIGS. 7A and 7B) (the zone (1) in FIG. 4), the intensity of the returned light beam L2 transmitted to the inspection portion 6 is equivalent to that intensity of the returned light beam L2 which is obtained when the welding state of the welded portion is normal. On the other hand, in a case where the focal point F5 of the inspection laser beam L5 is rotated several times along the generally round-shaped scanning locus C52 having a radius smaller than that of the scanning locus C51 so as to radiate the inspection laser beam L5 several times on the scanning locus C52 (see FIGS. 8A and 8B) (the zone (2) in FIG. 4), the intensity of the returned light beam L2 transmitted to the inspection portion 6 is lower than that intensity of the returned light beam L2 which is obtained when the welding state of the welded portion is normal.

According to the inspection method of Embodiment 1, the intensity of the returned light beam L2 received by the light-receiving portion 2 in the zone (1) illustrated in FIG. 4 (in that region inside the molten pool Y1 which is relatively spaced from the welding center C0) and an average intensity thereof are compared by the inspection portion 6 with the intensity of the returned light beam L2 received by the light-receiving portion 2 in the zone (2) illustrated in FIG. 4 (in that region inside the molten pool Y1 which is relatively close to the welding center C0) and an average intensity thereof. Hereby, even if the electrical signal obtained from the returned light beam L2 is weak or even if the intensity of the returned light beam L2 changes according to a change of a workpiece temperature, for example, it is possible to inspect whether or not the poor welding portion X1 exists inside the outer edge of the molten pool Y1, that is, whether or not poor welding occurs in the welded portion formed in the workpieces W1, W2. More specifically, the average intensity of the returned light beam L2 received by the light-receiving portion 2 in the zone (1) illustrated in FIG. 4 and the average intensity of the returned light beam L2 received by the light-receiving portion 2 in the zone (2) are calculated. Then, as illustrated in FIG. 9, a ratio (e.g., the zone (2)/the zone (1)) between both of the average intensities thus calculated is compared with a predetermined threshold. Thus, it is possible to inspect whether or not the poor welding portion X1 exists inside the outer edge of the molten pool Y1, that is, whether or not poor welding occurs in the welded portion formed in the workpieces W1, W2.

Particularly, in Embodiment 1, the inspection laser beam L5 is radiated to the molten pool Y1 along the generally round-shaped scanning loci C51, C52. On that account, it is possible to minutely inspect whether or not a generally round-shaped poor welding portion X1 exists in vicinity to the welding center C0 in the molten pool Y1.

Further, according to Embodiment 1, the inspection laser beam L5 is radiated along the scanning loci C51, C52 set in the molten pool Y1 formed by radiation of the welding laser beam L1. Then, the welding state of the welded portion is inspected based on the intensity of the returned light beam L2 received by the light-receiving portion 2. Accordingly, for example, even in a case where a focal position of the welding laser beam is spaced from an occurrence position of the poor welding portion X1, it is possible to appropriately adjust a scanning condition (a scanning locus and the like) of the inspection laser beam L5. This makes it possible to minutely inspect the welding state of the welded portion formed in the workpieces.

Note that it is considered that a periodic fluctuation of the intensity of the returned light beam L2 in the zone (1) shown in the continuous line in FIG. 4 or in the zone (2) shown in the dotted line in FIG. 4 is caused due to periodic vibration of a liquid level of the molten pool Y1 formed in the workpieces W1, W2 by radiation of the welding laser beam L1, for example. Further, it is considered that, in the zone (2) in the continuous line in FIG. 4, no periodic fluctuation occurs in the intensity of the returned light beam L2 because part of or all of the inspection laser beam L5 radiated from the inspection radiation portion 5 passes through the workpieces W1, W2.

[Embodiment 2 of Welded Portion Inspection Apparatus]

Next will be described Embodiment 2 of the welded portion inspection apparatus of the present invention with reference to FIG. 10.

Figure 10:
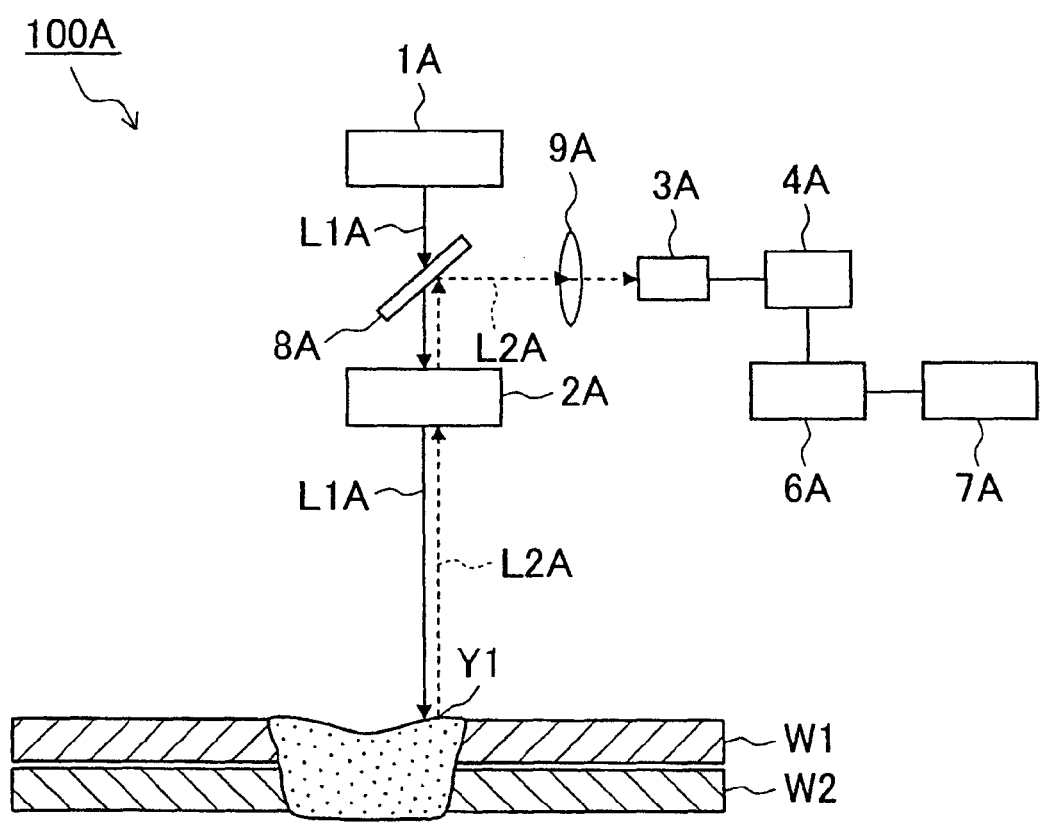
FIG. 10 is an overall configuration diagram schematically illustrating an overall configuration of Embodiment 2 of the welded portion inspection apparatus of the present invention.

FIG. 10 is an overall configuration diagram schematically illustrating an overall configuration of Embodiment 2 of the welded portion inspection apparatus of the present invention. An inspection apparatus 100A of Embodiment 2 as illustrated in FIG. 10 is different from the inspection apparatus 100 of Embodiment 1 as illustrated in FIG. 1 in that a welding state of a welded portion is inspected by use of reflection light of a welding laser beam radiated from a welding radiation portion. The other configuration is generally the same as the inspection apparatus 100 of Embodiment 1. Accordingly, constituents similar to those in Embodiment 1 have the same reference signs as those in Embodiment 1 and detailed descriptions thereof are omitted.

The inspection apparatus 100A illustrated in the figure is mainly constituted by a welding radiation portion 1A, a light-receiving portion 2A, a conversion portion 3A, an amplifier 4A, an inspection portion 6A, and a CRT 7A.

In order to weld two workpieces W1, W2 put on top of one another or disposed slightly spaced from each other, the welding radiation portion 1A radiates a welding laser beam L1A to the two workpieces W1, W2 via an optical system 8A and the light-receiving portion 2A. By radiation of the welding laser beam L1A from the welding radiation portion 1A, a molten pool Y1 where the workpieces W1, W2 are molten is formed on right and left sides of the welding laser beam L1A and behind the welding laser beam L1A in a traveling direction of the welding laser beam L1A.

The light-receiving portion 2A receives a returned light beam L2A including reflection light of the welding laser light L1A radiated from the welding radiation portion 1A, the reflection light being reflected from the molten pool Y1 of the workpieces W1, W2, vapor light (plasma light) caused due to melting and evaporation of the workpieces W1, W2, thermal radiation light (infrared light) emitted from the molten pool Y1 of the workpieces W1, W2, and the like.

The conversion portion 3A converts, into an electrical signal, the returned light beam L2A received by the light-receiving portion 2A and condensed via the optical system 8A and a condenser lens 9A, and outputs the electrical signal to the amplifier 4A. The amplifier 4A amplifies a signal intensity of the electrical signal output from the conversion portion 3A, and transmits it to the inspection portion 6A.

The inspection portion 6A performs signal processing on the electrical signal transmitted from the amplifier 4A, and inspects a welding state of the welded portion formed in the workpieces W1, W2. More specifically, the inspection portion 6A calculates an average intensity of the returned light beam L2A received by the light-receiving portion 2A in a region inside an outer edge of the molten pool Y1 which is relatively close to the welding center C0 and an average intensity of the returned light beam L2A received by the light-receiving portion 2A in a region inside the outer edge of the molten pool Y1 which is relatively spaced from the welding center C0. Then, the inspection portion 6A inspects the welding state of the welded portion formed in the workpieces W1, W2 based on a ratio between the average intensities of the returned light beams L2A. Further, the inspection portion 6A transmits, to the CRT 7A, a signal processing result on the electrical signal transmitted from the amplifier 4A. The CRT 7A displays the signal processing result transmitted from the inspection portion 6A.

In a case where the welding state of the welded portion is poor, that is, in a case where a poor welding portion X1 is formed in the molten pool Y1 (e.g., in a case of holed weld), when the welding laser beam L1A is radiated from the welding radiation portion 1A to the workpieces W1, W2, for example, part of the welding laser beam L1A passes through the workpiece W1 or the workpiece W2, or the workpieces W1, W2 are partially lacked, so that an increase of a workpiece temperature is restrained. Accordingly, similarly to Embodiment 1, that intensity of the returned light beam L2A which is transmitted to the inspection portion 6A is lower than that intensity of the returned light beam which is obtained when the welding state of the welded portion is normal. According to Embodiment 2, the inspection portion 6A compares the average intensity of the returned light beam L2A received in that region inside the molten pool Y1 which is relatively close to the welding center C0, with the average intensity of the returned light beam L2A received in that region inside the molten pool Y1 which is relatively spaced from the welding center C0. Hereby, similarly to Embodiment 1, even if the electrical signal obtained from the returned light beam L2A is weak or even if the intensity of the returned light beam L2A changes according to a change of a workpiece temperature, for example, it is possible to inspect whether or not the poor welding portion X1 is formed inside the outer edge of the molten pool Y1, that is, whether or not poor welding occurs in the welded portion formed in the workpieces W1, W2.

Note that Embodiment 1 described above deals with an embodiment in which the center of the scanning locus of the inspection laser beam is set to the welding center of the welding locus of the welding laser beam. However, it is possible to set the center of the scanning locus of the inspection laser beam to an appropriate position in the molten pool (inside the outer edge of the molten pool) formed by radiation of the welding laser beam.

Further, the embodiments described above deal with an embodiment in which the welding locus of the welding laser beam and the scanning locus of the inspection laser beam have a generally round shape. However, the welding locus of the welding laser beam and the scanning locus of the inspection laser beam may have a closed loop shape such as an elliptical shape or a polygonal shape, a spiral shape, or the like. Further, in a case where a part of the welded portion in which poor welding is easy to occur is predictable, it is preferable that the welding locus of the welding laser beam and the scanning locus of the inspection laser beam be set to pass through that part. Note that in a case where the welding locus of the welding laser beam has a generally round shape, the welding center is a center of the welding locus. In a case where the welding locus of the welding laser beam has a closed loop shape such as an elliptical shape or a polygonal shape, the welding center can be set to, for example, a centroid of the welding locus. In a case where the welding locus of the welding laser beam has a spiral shape, the welding center can be a center of the spiral of the welding locus.

Further, the above embodiments deal with an embodiment in which the intensity of the returned light beam received in that region inside the molten pool which is relatively close to the welding center is compared with the intensity of the returned light beam received in that region inside the molten pool which is relatively spaced from the welding center. However, it is possible to set reference points for comparison between the intensities of the returned light beams, to appropriate positions in the molten pool formed by radiation of the welding laser beam.

Further, the above embodiments mainly deal with an embodiment in which the average intensity of the returned light beam received in that region inside the molten pool which is relatively close to the welding center is compared with the average intensity of the returned light beam received in that region inside the molten pool which is relatively spaced from the welding center. However, part of the intensity of the returned light beam received in that region inside the molten pool which is relatively close to the welding center may be compared with part of the intensity of the returned light beam received in that region inside the molten pool which is relatively spaced from the welding center.

Further, the above embodiments deal with an embodiment in which the welding laser beam and the inspection laser beam are radiated to workpieces fixed to a predetermined position. However, focal positions of the welding laser beam and the inspection laser beam may be fixed and laser beam welding may be performed on the workpieces while the workpieces are being moved appropriately. Alternatively, laser beam welding may be performed on the workpieces such that the workpieces and the focal positions of the welding laser beam and the inspection laser beam are moved relative to each other.

[Experiment on Inspection Samples to Evaluate Relationship of Welding State of Welded Portion with Ratio Between Average Intensities of Returned Light Beams, and Results Thereof]

The inventor(s) of the present invention manufactured two types of inspection samples (Examples 1, 2) having different welding states, and performed intensity measurement of returned light beams from each of the inspection samples so as to evaluate a relationship of a welding state of a welded portion with a ratio between the average intensities of the returned light beams.

<Manufacturing Method of Inspection Sample and Measurement Method of Intensity of Returned Light Beam from Inspection Sample>

Initially, the following generally describes a manufacturing method of an inspection sample and a measurement method of an intensity of a returned light beam from an inspection sample. Two workpieces each made from SCGA440 having a thickness of 0.7 mm were put on top of one another, and a welding laser beam was radiated to the workpieces along a generally round-shaped welding locus so as to form a generally round-shaped welded portion having a radius of about 2.5 mm. Subsequently, an inspection laser beam (with an output of 1000 W and at a scanning speed of 90 m/min) was radiated to go around ten times along a generally round-shaped scanning locus (with a welding center being taken as its center) having a radius of about 1.7 mm so as to pass through a molten pool formed in the workpieces. Then, a focal point of the inspection laser beam was moved only by about 1.4 mm, and the inspection laser beam was radiated to go around ten times along a generally round-shaped scanning locus (with the welding center being taken as its center) having a radius of about 0.3 mm. Here, a returned light beam including reflection light of the inspection laser beam which was reflected from the molten pool of the workpieces, vapor light caused by melting and evaporation of the workpieces, thermal radiation light emitted from the molten pool of the workpieces, and the like was received. The returned light beam thus received was converted into an electrical signal, and a signal intensity thereof was measured. Note that, in the returned light beam, particularly a signal intensity of the thermal radiation light (infrared light) emitted from the molten pool of the workpieces was measured in this experiment.

<Results of Evaluation on Relationship of Welding State of Welded Portion with Ratio Between Average Intensities of Returned Light Beams According to Inspection Sample>

Figure 11A:
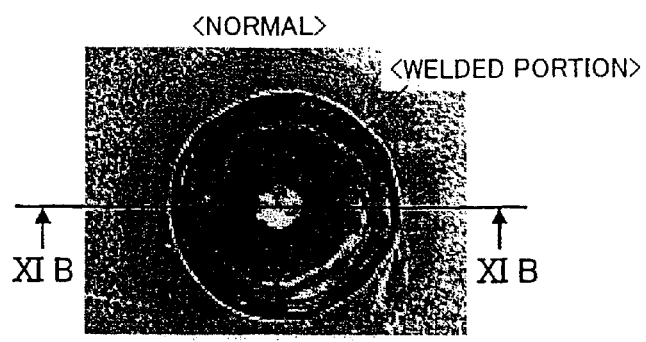
FIG. 11A is a top view enlarging and illustrating a welded portion of an inspection sample according to Example 1.
Figure 11B:
FIG. 11B is a view taken along an arrow XIB-XIB in FIG. 11A.
Figure 11C:
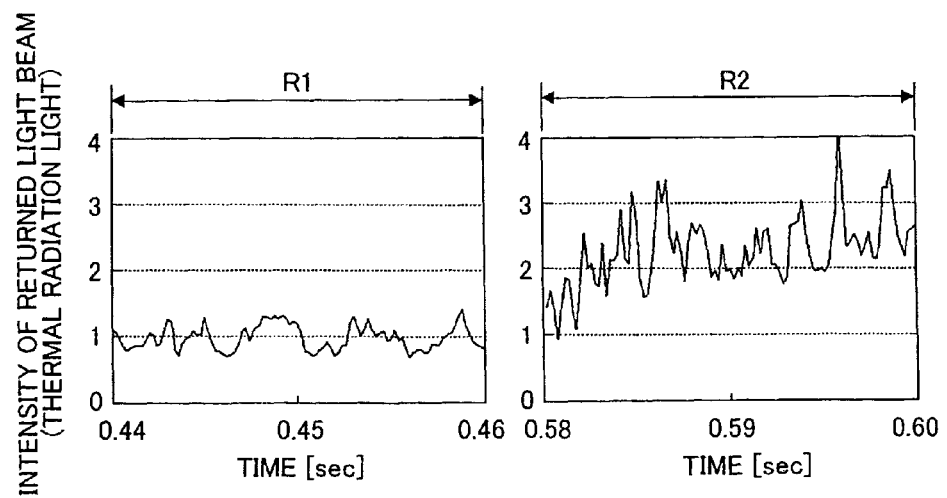
FIG. 11C is a view illustrating intensities of returned light beams in the inspection sample according to Example 1 in time series.

FIG. 11A is a top view enlarging and illustrating a welded portion of the inspection sample according to Example 1, FIG. 11B is a view taken along an arrow XIB-XIB in FIG. 11A, and FIG. 11C is a view illustrating an intensity of a returned light beam of the inspection sample according to Example 1 in time series. Further, FIG. 12A is a top view enlarging and illustrating a welded portion of the inspection sample according to Example 2, FIG. 12B is a view taken along an arrow XIIB-XIIB in FIG. 12A, and FIG. 12C is a view illustrating an intensity of a returned light beam of the inspection sample according to Example 2 in time series.

As illustrated in FIGS. 11A to 11C, in the inspection sample of Example 1 (a welding state is normal), it was found that an intensity of a returned light beam in a zone R2 (about 0.58 to about 0.60 sec) in which the inspection laser beam was radiated along the scanning locus having a radius of about 0.3 mm was relatively larger than an intensity of a returned light beam measured in a zone R1 (about 0.44 to about 0.46 sec) in which the inspection laser beam was radiated along the scanning locus having a radius of about 1.7 mm. Further, in the inspection sample of Example 1, it was found that the intensity of the returned light beam measured in the zone R2 included a periodic fluctuation.

Figure 12A:
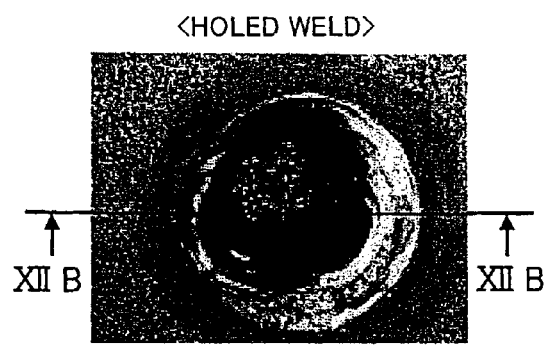
FIG. 12A is a top view enlarging and illustrating a welded portion of an inspection sample according to Example 2.
Figure 12B:
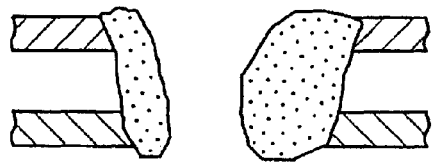
FIG. 12B is a view taken along an arrow XIIB-XIIB of FIG. 12A.
Figure 12C:
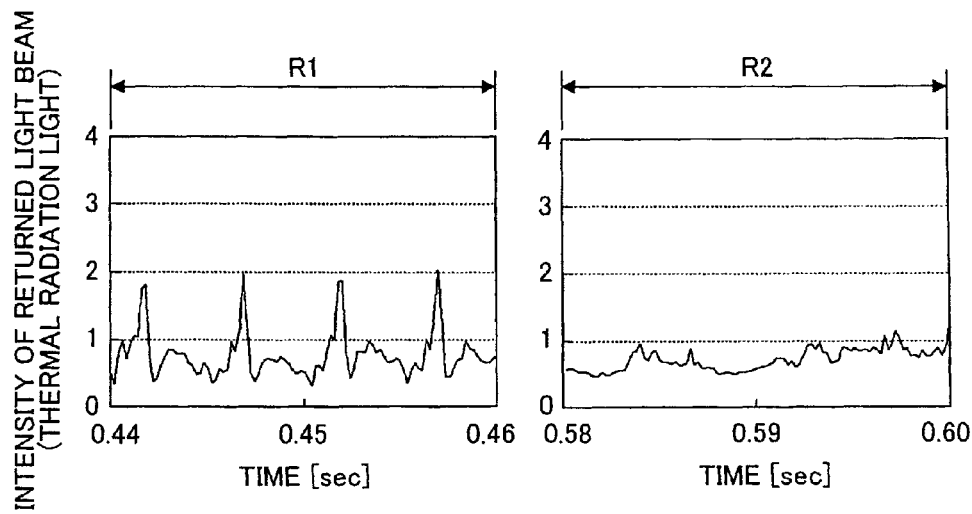
FIG. 12C is a view illustrating intensities of returned light beams in the inspection sample according to Example 2 in time series.

On the other hand, as illustrated in FIGS. 12A to 12C, in the inspection sample of Example 2 (holed weld in which two workpieces were both molten and depressed), it was found that an intensity of a returned light beam measured in a zone R1 (about 0.44 to about 0.46 sec) in which the inspection laser beam was radiated along the scanning locus having a radius of about 1.7 mm was equivalent to an intensity of a returned light beam in a zone R2 (about 0.58 to about 0.60 sec) in which the inspection laser beam was radiated along the scanning locus having a radius of about 0.3 mm. That is, it was found that the intensity of the returned light beam measured in the zone R2 in the inspection sample of Example 2 was relatively small in comparison with the inspection sample of Example 1. Further, in the inspection sample of Example 2, it was found that the intensity of the returned light beam measured in the zone R1 included a periodic fluctuation, but the intensity of the returned light beam measured in the zone R2 included little periodic fluctuation.

FIG. 13 is a view illustrating ratios between average intensities of returned light beams in the inspection samples according to Examples 1, 2. Here, the ratio between average intensities of returned light beams in each of the inspection samples according to Examples 1, 2 was calculated such that an average intensity (an intensity of a returned light beam per unit time) of the returned light beam measured in the zone R2 (about 0.58 to about 0.60 sec) where the inspection laser beam was radiated along the scanning locus having a radius of about 0.3 mm was divided by an average intensity (an intensity of a returned light beam per unit time) of the returned light beam measured in the zone R1 (about 0.44 to about 0.46 sec) where the inspection laser beam was radiated along the scanning locus having a radius of about 1.7 mm. Note that, in FIG. 13, ten inspection samples were formed for each of Examples 1, 2, and that ratio between the average intensities of the returned light beams which was calculated about each inspection sample was illustrated.

As illustrated in FIG. 13, it was found that the ten inspection samples of Example 1 (the welding state is normal) had substantially the same ratio between the average intensities. Further, it was found that the ten inspection samples of Example 2 (holed weld) had substantially the same ratio between the average intensities. In addition to that, it was found that the ratios between the average intensities of the returned light beams in the inspection samples of Example 1 were relatively larger than the ratios between the average intensities of the returned light beams in the inspection samples of Example 2.

In this experiment, an average intensity of a returned light beam received in that region (corresponding to the zone R2) inside a molten pool which is relatively close to a welding center and an average intensity of a returned light beam received in that region (corresponding to the zone R1) inside the molten pool which is relatively spaced from the welding center were calculated, and a ratio between the average intensities was compared with a predetermined threshold. From this experimental results, the following was demonstrated: according to such a simple and easy method, even if the intensity of the returned light beam received by the light-receiving portion changes according to a change of a workpiece temperature (e.g., an increase of the workpiece temperature in welding, a change of the workpiece temperature due to a change of an external temperature), or even if the intensity of the returned light beam received by the light-receiving portion changes according to periodic vibration of a liquid level of the molten pool, it is possible to minutely inspect the welding state of the welded portion, including poor welding such as holed weld or one-piece depressed weld in an area in vicinity to the welding center.

Thus, the embodiments of the present invention have been described with reference to the drawings, but concrete configurations of the present invention are not limited to the above embodiments. Even if there are changes of design or the like within a range that does not deviate from a gist of the present invention, they are included in the present invention.

The invention claimed is:

1. A welded portion inspection apparatus that inspects a welding state of a welded portion formed at the time when a plurality of workpieces is welded, the welded portion inspection apparatus comprising:
    a laser beam radiation portion that radiates a welding laser beam several times along one welding locus set in the workpieces so as to weld the workpieces, or radiates an inspection laser beam several times along one scanning locus set in a molten pool of the workpieces that are molten by the welding laser beam;
    a laser-receiving sensor that receives a returned light beam including at least one of reflection light of the welding laser beam or the inspection laser beam radiated by the laser beam radiation portion, the reflection light being reflected from the molten pool of the workpieces, vapor light caused due to melting and evaporation of the workpieces, and thermal radiation light emitted from the molten pool of the workpieces; and
    a measuring instrument that monitors an intensity of a returned light beam received by the laser-receiving sensor in a first region inside the molten pool of the workpieces which is relatively close to a given point and an intensity of a returned light beam received by the laser-receiving sensor in a second region inside the molten pool of the workpieces which is relatively spaced from the given point, in order to inspect a welding state of a welded portion of the workpieces.

2. The welded portion inspection apparatus according to claim 1, wherein:
    the measuring instrument inspects the welding state of the welded portion of the workpieces based on a ratio between the intensity of the returned light beam received by the laser-receiving sensor in the first region and the intensity of the returned light beam received by the laser-receiving sensor in the second region.

3. The welded portion inspection apparatus according to claim 1, wherein:
    the welding locus of the welding laser beam or the scanning locus of the inspection laser beam has a closed loop shape or a spiral shape.

4. The welded portion inspection apparatus according to claim 3, wherein:
    the welding locus of the welding laser beam or the scanning locus of the inspection laser beam has a round shape or an elliptical shape.

5. The welded portion inspection apparatus according to claim 3, wherein:
    the given point is a welding center of the workpieces.

6. The welded portion inspection apparatus according to claim 1, wherein:
    the measuring instrument inspects the welding state of the welded portion of the workpieces based on an average intensity of the returned light beam received by the laser-receiving sensor in the first region and an average intensity of the returned light beam received by the laser-receiving sensor in the second region.

7. A welded portion inspection method for inspecting a welding state of a welded portion formed at the time when a plurality of workpieces is welded, the welded portion inspection method comprising:
    radiating a welding laser beam several times along one welding locus set in the workpieces so as to weld the workpieces, or radiating an inspection laser beam several times along one scanning locus set in a molten pool of the workpieces that are molten by the welding laser beam;
    receiving a returned light beam including at least one of reflection light of the welding laser beam or the inspection laser beam which is reflected from the molten pool of the workpieces, vapor light caused due to melting and evaporation of the workpieces, and thermal radiation light emitted from the molten pool of the workpieces; and
    inspecting a welding state of a welded portion of the workpieces based on an intensity of a returned light beam received in a first region inside the molten pool of the workpieces which is relatively close to a given point and an intensity of a returned light beam received in a second region inside the molten pool of the workpieces which is relatively spaced from the given point.

8. The welded portion inspection method according to claim 7, wherein:
    in the of the welding state, the welding state of the welded portion of the workpieces is inspected based on a ratio between the intensity of the returned light beam received in the first region and the intensity of the returned light beam received in the second region.

9. The welded portion inspection method according to claim 7, wherein:
    the welding locus of the welding laser beam or the scanning locus of the inspection laser beam has a closed loop shape or a spiral shape.

10. The welded portion inspection method according to claim 9, wherein:
    the welding locus of the welding laser beam or the scanning locus of the inspection laser beam has a round shape or an elliptical shape.

11. The welded portion inspection method according to claim 9, wherein:
    the given point is a welding center of the workpieces.

12. The welded portion inspection method according to claim 7, wherein:
    in the inspecting of the welding state, the welding state of the welded portion of the workpieces is inspected based on an average intensity of the returned light beam received in the first region and an average intensity of the returned light beam received in the second region.

* * * * *